United States Patent [19]

Scoggin

[11] 3,941,664
[45] Mar. 2, 1976

[54] CONTROL FOR DILUENT REMOVAL FROM POLY(ARYLENE SULFIDE) REACTOR PRODUCT

[75] Inventor: Jack S. Scoggin, Bartlesville, Okla.

[73] Assignee: Phillips Petroleum Company, Bartlesville, Okla.

[22] Filed: Aug. 29, 1972

[21] Appl. No.: 284,462

[52] U.S. Cl. .................. 203/1; 203/88; 203/95; 202/206; 159/44; 159/2 R; 260/79.1
[51] Int. Cl.² .......................................... B01D 3/42
[58] Field of Search .......... 159/44; 202/206; 203/1, 203/DIG. 9, DIG. 18, 88, 1, 95, 96; 260/402, 79.1

[56] References Cited
UNITED STATES PATENTS

| | | | |
|---|---|---|---|
| 2,054,096 | 9/1936 | Potts et al. | 203/88 |
| 2,414,371 | 1/1947 | Fragen et al. | 202/206 |
| 2,900,312 | 8/1959 | Gilmore | 203/2 |
| 3,176,756 | 4/1965 | Dukelow | 202/206 |
| 3,356,124 | 12/1967 | Dambrine | 159/44 |
| 3,357,900 | 12/1967 | Snell | 203/88 |
| 3,394,053 | 7/1968 | Shinskey | 203/1 |
| 3,421,610 | 1/1969 | Marshall | 203/DIG. 9 |
| 3,478,000 | 11/1969 | Saunders | 260/79.1 |
| 3,506,715 | 4/1970 | Clark | 196/132 |
| 3,707,528 | 12/1972 | Miles | 260/79.1 |
| 3,800,845 | 4/1974 | Seoggin | 203/73 |

*Primary Examiner*—Norman Yudkoff
*Assistant Examiner*—Frank Sever

[57] ABSTRACT

A method for control of the steam flashing of poly(arylene sulfide) reaction product to remove substantially all of the reaction diluent from a reaction mixture containing poly(arylene sulfide) polymer, organic polar diluent, byproduct alkali metal halide, and reaction mixture impurities is provided by measuring the vapor effluent from the flashing operation, producing a signal representative of this flow, controlling the rate of flow of the effluent from the reactor in response to this signal, and controlling the rate of flow of steam admixed with the reactor effluent in ratio to the effluent flow.

3 Claims, 1 Drawing Figure

U.S. Patent   March 2, 1976   3,941,664
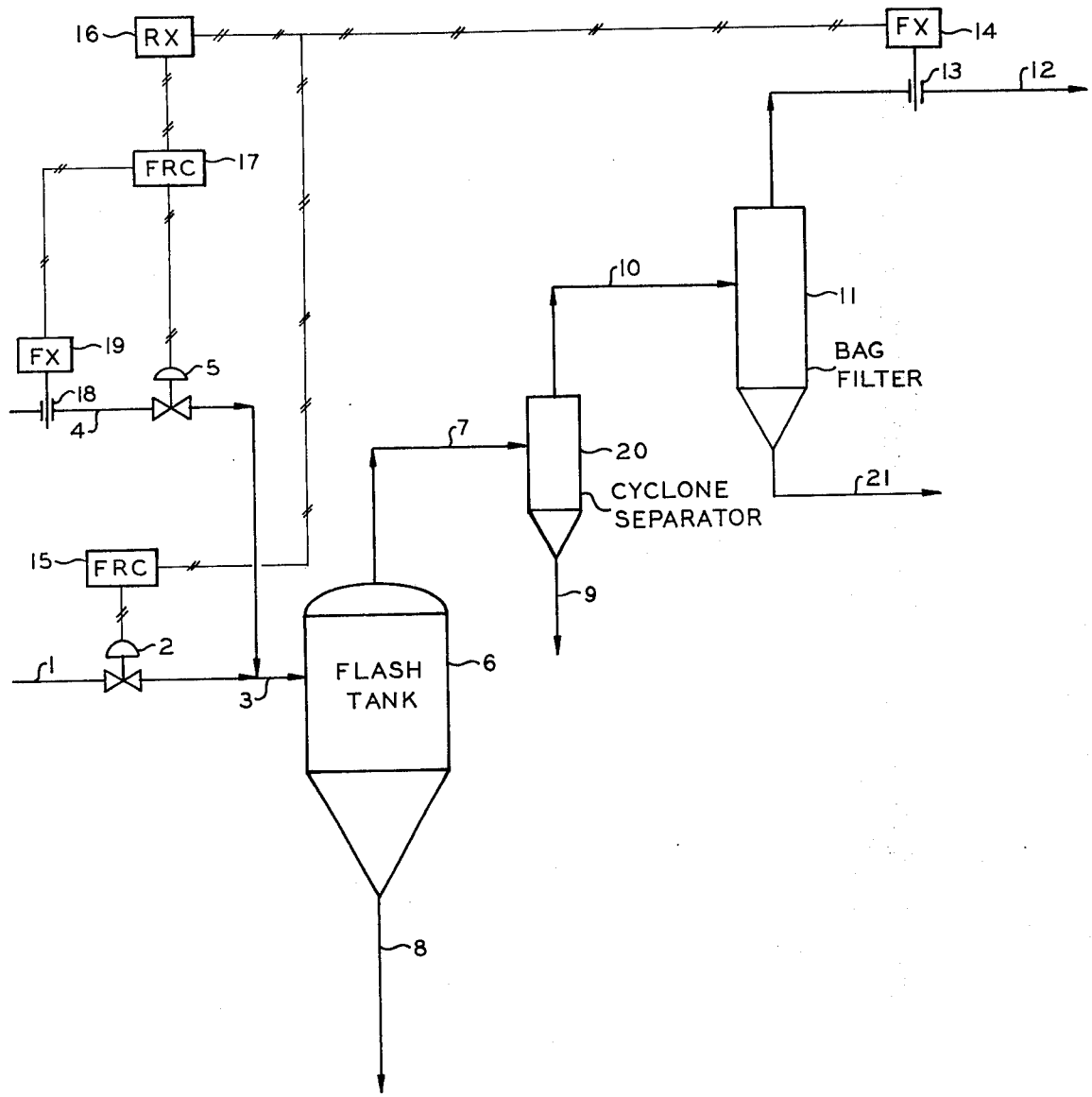

CONTROL FOR DILUENT REMOVAL FROM POLY(ARYLENE SULFIDE) REACTOR PRODUCT

BACKGROUND OF THE INVENTION

This invention relates to recovery of the constituents of the poly(arylene sulfide) from reaction slurries. In accordance with one aspect of the invention it relates to the recovery of polar organic diluent from a poly(arylene sulfide) reaction mixture. In another aspect of the invention it relates to the evaporation of diluents from a mixture of reaction slurry with steam. In still another aspect of the invention it relates to the control of flows in a flash evaporation operation.

In one of its concepts, this invention relates to the evaporation of polar organic diluent from a mixture of a reaction effluent with steam added to reduce the dew point of the reaction diluent as an aid to evaporation. In another of its concepts, the invention relates to control of flows of reaction slurry and steam to produce an optimum evaporation mixture using steam dilution of a slurry.

In copending application Ser. No. 214,036, filed Dec. 30, 1971, now abandoned a method for removal of substantially all of the reaction diluent from a reaction mixture containing poly(arylene sulfide) polymer, organic polar diluent, byproduct alkali metal halide, and reaction slurry impurities is described. This method provides for mixing reactor effluent with high pressure steam and reducing the pressure of the mixture to atmospheric pressure in a flash tank. To best take advantage of the steam dilution evaporation techniques taught by the above-mentioned application, a method for controlling the amount of steam in relation to the polymer slurry is desirable. Although other control methods have been proposed for atmospheric, steam diluted, evaporation processes it has now been discovered that excellent results in diluent removal can be obtained by ratioing the steam dilution to the reactor effluent which is controlled by the amount of vapor leaving the flash zone in the evaporation process.

Accordingly, it is an object of this invention to provide an economical and effective method of control for the recovery of polar diluent from the reaction mixture of a poly(arylene sulfide) reaction using steam dilution of the reaction slurry. It is another object of this invention to provide a control system for the recovery of polar diluent from the reaction mixture of a poly(arylene sulfide) reaction using steam dilution.

Other aspects, objects and the several advantages of this invention will be apparent to one skilled in the art upon reading the specification and appended claims of this invention.

SUMMARY OF THE INVENTION

In accordance with the invention, in a process for the recovery of polar organic diluent from a reaction effluent slurry comprising poly(arylene sulfide), polar organic diluent, byproduct alkali metal halide, and reaction impurities by mixing the reactor effluent with steam and reducing the pressure to flash the mixture, a method of controlling the flashing operation is provided which comprises (1) determining the flow of flashed vapor from the flashing operation and producing a signal representative thereof; (2) controlling the rate of flow of effluent from the reactor in response to said signal; and (3) controlling the rate of flow of steam admixed with the reactor effluent in ratio to the effluent flow.

In one embodiment of the invention a system for recovering polar organic diluent from a poly(arylene sulfide) reaction effluent slurry using steam dilution of the reactor effluent is provided in which the system comprises in combination (1) means for flash evaporating a mixture of reaction slurry and steam; (2) means for measuring the vapor flow from the flash evaporation and producing a signal representative thereof; (3) means for controlling the rate of flow of effluent from the reactor in response to the signal produced above; and (4) means for controlling the rate of flow of steam admixed with the effluent in ratioed relation to the effluent flow.

The process of this invention is useful with poly(arylene sulfides) generally, regardless of the method of preparation. However, the invention is especially useful with polymers prepared by the reaction of polyhalo compounds with metal sulfide as described in U.S. Pat. No. 3,354,129.

According to said patent poly(arylene sulfide) polymers can be prepared at high yield by reacting at least one polyhalo-substituted cyclic compound containing unsaturation between adjacent ring atoms and wherein the halogen atoms are attached to ring carbon atoms with an alkali metal sulfide in a polar organic diluent at an elevated temperature. Generally, the polar organic diluent will substantially dissolve both of the alkali metal sulfide and the polyhalo-substituted aromatic compound or other compound which can be present. The polymers produced by the process of said patent are ordinarily particulate materials and the properties of these materials will vary considerably depending upon the chosen reactants. Some are high melting thermoplastic materials having excellent high temperature stability, while others can be much lower in molecular weight, including liquids and grease-like materials. Melting point or softening point of these polymers can range all the way from liquids at 25°C. to polymers melting above 400°C.

The polyhalo-substituted compounds which can be employed as primary reactants according to said patent are represented by the formulas:

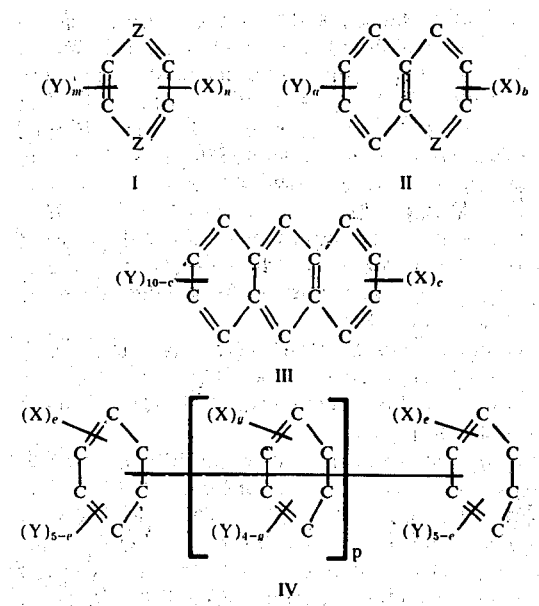

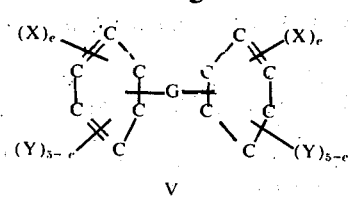

V

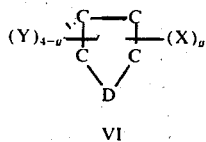

VI wherein each X is a halogen selected from the group consisting of chlorine, bromine, iodine, and fluorine, preferably chlorine and bromine, each Y is selected from the group consisting of hydrogen, —R, —N(R)$_2$,

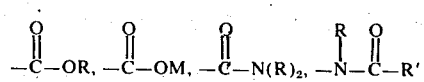

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms inclusive; each Z is selected from the group consisting of —N= and —C=, D is selected from the group consisting of —O—, —S—, and

G is selected from the group consisting of

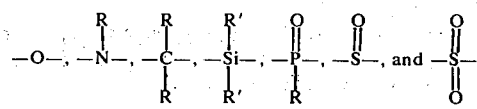

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive; $e$ is a whole integer of from 1 to 5, inclusive; $g$ is a whole integer of from 2 to 4, inclusive; and $p$ is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said patent are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60–62 weight percent Na$_2$S and about 38–40 weight percent water of hydration.

The polar organic compounds which are employed as reaction media in the process of said patent should be solvents for the polyhaloaromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides, and the like.

Some specific examples of polyhalo-substituted compounds of the above general formulas which can be employed in the process of said patent are:
1,2-dichlorobenzene
1,3-dichlorobenzene
1,4-dichlorobenzene
2,5-dichlorotoluene
1,4-dibromobenzene
1,4-diiodobenzene
1,4-difluorobenzene
2,5-dibromoaniline
N,N-dimethyl-2,5-dibromoaniline
1,3,5-trichlorobenzene
1,2,4-trichlorobenzene
1,2,4,5-tetrabromobenzene
hexachlorobenzene
1-n-butyl-2,5-dichlorobenzene, and the like.

The reactor effluent from the reaction producing arylene sulfide polymer will have a composition of about 1:1:2 of polymer:salt:polar diluent plus various impurities from the reaction. The temperature of the reactor effluent will be in the range of 450° to 600°F. and will be pressured from the reactor with steam or nitrogen at a pressure in the range of 50 to 250 psig, preferably about 200 psig.

The steam used for mixing with the polymer effluent should be superheated and be about the same pressure as the effluent before the pressure is reduced. Good results are obtained at a pressure of about 200 psig for the steam. The temperature in the blending-drying equipment is maintained by jacketed heaters at a temperature sufficiently high to vaporize the polar diluent and water.

The operation of this invention can be best understood by reference to the drawing which shows a control system and method for controlling the removal of polar diluent from a poly(arylene sulfide) reaction mixture containing arylene sulfide polymer, sodium chloride, polar diluent, and various impurities from the reaction. For purposes of illustration the operation of the invention will be described for a reaction mixture containing N-methyl pyrrolidone as the polar diluent. As stated above, other diluents can be used in the process of this invention.

Referring now to the drawing, effluent from the reactor is pressured from about 20 psig to about 200 psig, for this example at 200 psig, to a transfer line 1 through a pressure reducing motor valve 2 where the pressure is reduced to substantially atmospheric pressure, into a transfer line 3. Although steam at pressure ranging from 10 psig to 1500 psig could be used, for this example superheated 200 psig steam at about 450°F from line 4 is transferred through pressure reducing valve 5 into transfer line 3 to mix with the reaction effluent at substantially atmospheric pressure. Upon entering flash tank 6, water, N-methyl pyrrolidone (NMP) and dichlorobenzene (DCB) vaporize and go overhead through line 7 while poly(phenylene sulfide) (PPS), salt, solid impurities and residual NMP drop to the bottom of the flash tank and are removed through line 8. The solid product can then be further treated for the removal of residual polar diluent.

The flashed vapors consisting mainly of NMP, water vapor and DCB with some solid fine particulate material passes through line 7 into a cyclone separator 20 where most of the fine particulate matter is removed from the base of the cyclone separator through line 9 while the vapors are removed from the top of the cyclone through line 10. The remaining fines materials are removed in a bag filter 11 from which the vapors are removed through line 12 and fines through line 21. Fines material collected in both the cyclone and the bag filter can be processed with the polymer solids that were removed from the flash zone. The fines from the cyclone can be returned directly by a suitable line to be admixed with the polymer solids and the bag filter fines can be removed as necessary for the separation of the filter for return to a polymer treatment system.

In the vapor line 12 effluent from the bag filter, the vapor flow, is measured by a flow element 13. A flow transmitter 14 transmits a signal representative of the flow to a flow recorder controller 15 which adjusts the motor valve 2 in reactor effluent line 1 in response to the signal. The flow signal from flow transmitter 14 also is fed to a ratio relay 16 which sets the flow of superheated steam in a flow recorder controller 17 at a predetermined ratio to the flow passing through flow element 13. This flow recorder controller regulates the flow through motor valve 5 and records the flow of steam measured at flow element 18 acting on a signal produced by flow transmitter 19. A ratio in the range of 0.5 pounds steam per pound of total flow has been effective. A ratio in the range of 0.15 pounds steam per pound of total flow is presently preferred.

A material balance for typical operation of this system is presented below. In this material balance the composition of the streams is shown on the basis of pounds per pound of poly(phenylene sulfide) in the reactor effluent stream using a ratio of pounds of steam to pounds of total flow in line 12 of approximately .15 to 1.

| Stream | 1 | 3 | 7 | 8 | 9 | 10 | 21 | 12 |
|--------|------|------|------|------|------|------|------|------|
| PPS    | 1.0  | 1.0  | 0.05 | 0.95 | 0.02 | 0.03 | 0.03 |      |
| NaCl   | 1.1  | 1.1  | 0.05 | 1.05 | 0.02 | 0.03 | 0.03 |      |
| NMP    | 2.0  | 2.0  | 1.98 | 0.02 |      | 1.98 |      | 1.18 |
| DCB    | 0.01 | 0.01 | 0.01 |      |      | 0.01 |      | 0.01 |
| $H_2O$ |      | 0.36 | 0.36 |      |      | 0.36 |      | 0.36 |

Reasonable variation and modification are possible within the scope of the foregoing disclosure, the drawing and the appended claims to the invention the essence of which is that there has been provided a method and system of control for the removal of polar diluent from the reaction mixture of poly(arylene sulfide) containing arylene sulfide polymer, salt, polar diluent, and various impurities, using steam dilution of the reaction mixture with flash evaporation.

I claim:

1. In a process for recovering polar organic diluent from reactor effluent slurry comprising poly(arylene sulfide), polar organic diluent, alkali metal halide, and reaction impurities, by mixing the reactor effluent with steam and reducing the pressure to flash the mixture, with a method for control, the improvement comprising:
   1. generating a signal characteristic of the flow rate of flashed vapor from the flashing operation;
   2. controlling the rate of flow of effluent from the reactor in response to said signal; and
   3. controlling the rate of flow of steam admixed with the reactor effluent in predetermined ratio to the flow of flashed vapor in response to said signal.

2. The process of claim 1 wherein entrained solids particles are removed from the flashed vapor upstream of the flashed vapor flow determination.

3. The process of claim 1 wherein polar organic diluent is N-methylpyrrolidone.

* * * * *